Sept. 4, 1962  H. E. POWELL  3,052,153
ANALYZING STRESSES IN TRANSPARENT ARTICLES
Filed Sept. 27, 1956

INVENTOR.
HOMER EUGENE POWELL
BY W. A. Schaich and
Leonard D. Soubier
ATTORNEYS.

United States Patent Office 3,052,153
Patented Sept. 4, 1962

3,052,153
ANALYZING STRESSES IN TRANSPARENT ARTICLES
Homer E. Powell, Maumee, Ohio, assignor to Owens-Illinois Glass Company, a corporation of Ohio
Filed Sept. 27, 1956, Ser. No. 612,531
2 Claims. (Cl. 88—14)

This invention relates to analyzing stresses in transparent articles and particularly to a method and apparatus for analyzing the stresses in highly stressed glass articles.

In analyzing the stresses in transparent articles such as glass insulators, one method which is used comprises directing a beam of heterochromatic light through the article and interposing polarizing plates in the path of the beam. When viewed by a magnifier or microscope or other system, a plurality of fringes are found in the article which indicate the stress of the article. The number of fringe orders or bands is dependent upon the stress of the article.

The color of the various fringes varies. The first fringe order changes from black successively to gray, white, yellow, orange, red and finally to violet or purple. The second fringe order changes from blue to green, yellow, orange, and the third fringe order to a second purple less definite and less intense than the first fringe order. If the article is more greatly stressed, additional fringe orders are formed. The third fringe order changes through more pale and less distinct variations of the colors in the second fringe order. The fourth fringe order has colors which are even more pale so that fringe orders from the fourth and beyond are more readily described as pastel green and pink.

When the stress is such that the fringe orders are more than two, the retardation is more than about 1100 millimicrons. When the number of fringe orders becomes, for example, as much as twelve or more, it becomes quite difficult to distinguish clearly between one fringe order and the next. When the article is not only highly stressed but, in addition, non-uniform in shape, the problem of distinguishing the fringe orders becomes more difficult.

In analyzing the stresses of non-uniformly shaped articles, it has been heretofore suggested that the article be immersed in a cell containing a liquid having an index of refraction which is close to that of the article being analyzed. The cell operates to reduce the light reflected from the curved surfaces of the non-uniformly shaped article. However, in certain types of liquids which have been used, the liquid becomes contaminated in continuous use and assumes a yellowish or reddish color which makes it even more difficult to distinguish the fringe orders.

It is therefore an object of this invention to provide a method and apparatus for analyzing the stresses in highly stressed articles by using heterochromatic light.

It is a further object of this invention to provide such a method and apparatus which may be utilized for analyzing the stresses in non-uniformly shaped articles.

It is a further object of this invention to provide such an apparatus which is inexpensive.

Figure 1:
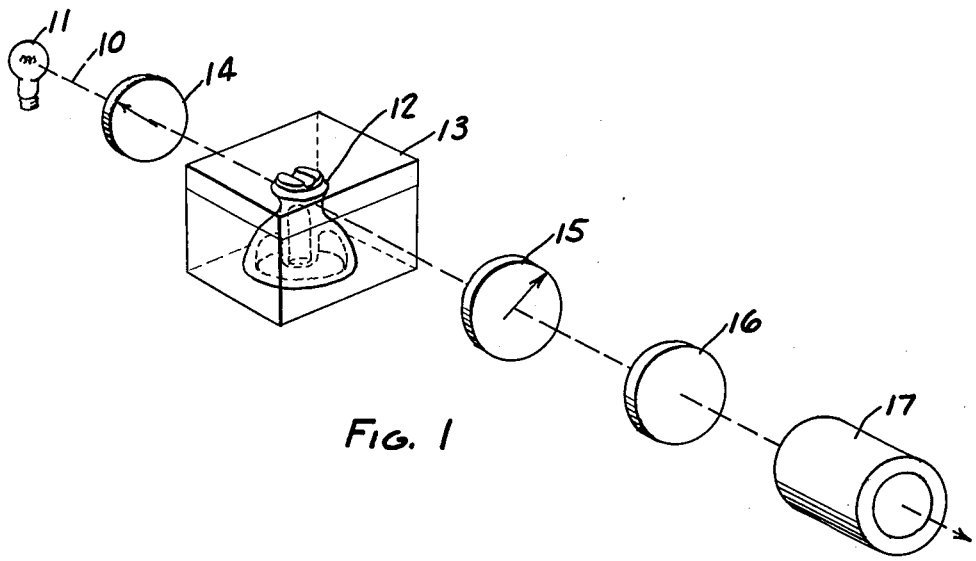
FIG. 1 is a prospective view of an apparatus embodying the invention.

Referring to FIG. 1, a beam 10 of heterochromatic light is directed from a source 11 through a transparent article 12 which is shown as a non-uniformly shaped glass insulator, such as is used to support electric power lines. Article 12 is submerged in a cell 13 containing a liquid or a mixture of liquids which have an index of refraction which is comparable to the index of refraction of the article 12. In the case of glass, the liquid in cell 13 may be monochlorobenzene. The liquid in cell 13 operates to reduce the light reflected from the curved surfaces of article 12. Polarizing plates 14, 15 are positioned in the path of beam 10. The optical axes of the polarizing plates 14, 15 are at 90° to each other and at 45° to the principal stress directions in article 12.

A didymium glass filter 16 is positioned in the path of the beam of light and the fringe orders are analyzed by an eye piece 17 or some other suitable device such as a microscope or a projecting system. Didymium is utilized to designate a glass containing the elements neodymium and praseodymium. A typical transmission curve for such glass is found in "The Properties of Glass" by Morey, Reinhold Publishing Corp., 1938, pages 436, 437.

Figure 2:
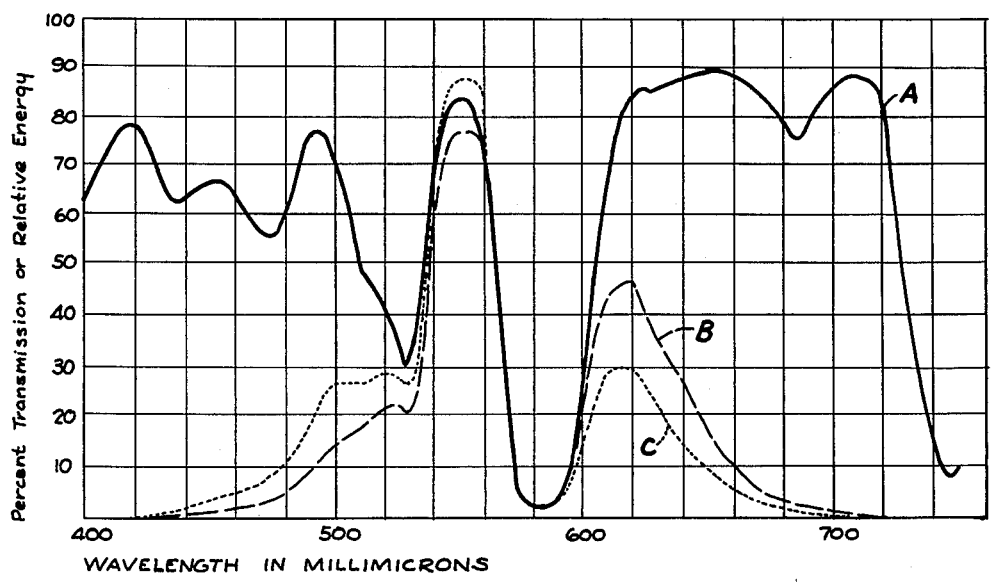
FIG. 2 is a graph of percent transmission versus wave length.

Referring to FIG. 2, the transmission curve A of a didymium glass filter shows that the filter has a significantly low transmission in the area ranging from approximately 570 to 600 millimicrons. The filter transmits substantial amounts of light in the green region, approximately 550 millimicrons, and in the red region, approximately 610 millimicrons. If a heterochromatic source, such as an incandescent light bulb, having a color temperature of approximately 2850° K. is used in conjunction with the didymium filter, the transmission curve designated as B in FIG. 2 is obtained. It can be seen that the green peak of curve B lies generally between 540 millimicrons and 565 millimicrons and the red peak lies generally between 600 millimicrons and 640 millimicrons. The didymium filter thus acts to reduce the undesirable yellow and orange portions of the light and, in turn, accentuate the red or green portions of the light. As a result, when the didymium filter is used in the apparatus shown in FIG. 1 with an incandescent light bulb as source 11, the alternating bands of the fringe orders are more readily discernible to the eyes of the observer and they can be more accurately analyzed to determine the stress in the article.

If a heterochromatic light source, such as a fluorescent daylight bulb, having a color temperature of approximately 6500° K. is used with a didymium filter, the transmission curve designated as C in FIG. 2 is obtained. It can be seen from this curve that the didymium filter again acts to reduce the yellow and orange portions of the light and to accentuate the red and green portions. Thus, when a fluorescent light bulb is used as source 11, the alternating bands of the fringe orders may be more easily distinguished.

It can thus be seen that by using a didymium filter in conjunction with a heterochromatic light source, the analysis of the stresses in a transparent article becomes easier, resulting in greater accuracy. The filter may be positioned anywhere in the path of the light beam except if stresses are found therein, in which case it should not be located between polarizing plates 14 and 15.

I claim:

1. In an apparatus for analyzing the stresses in transparent articles, the combination comprising means for forming a beam of heterochromatic light, means for supporting a transparent article in the path of the heterochomatic light, a pair of polarizing plates, means for supporting said polarizing plates in the path of the light beam, a light absorbing filter made of didymium glass having its lowest transmission in the visible spectrum between wavelengths of 570 and 600 millimicrons, and means for supporting said filter in the path of said light beam.

2. The combination set forth in claim 1 wherein said means for supporting said transparent article includes a cell containing liquid having an index of refraction comparable to the index of refraction of the transparent article which is being analyzed.

References Cited in the file of this patent

UNITED STATES PATENTS

| | | |
|---|---|---|
| 1,552,450 | Roach | Sept. 8, 1925 |
| 1,711,347 | Harter | Apr. 30, 1929 |
| 2,174,269 | Land | Sept. 26, 1939 |
| 2,310,623 | Estey | Feb. 9, 1943 |
| 2,730,007 | Chapman | Jan. 10, 1956 |

OTHER REFERENCES

"Spectral-Transmissive Properties and Use of Eye-Protective Glasses," publication of Stair, National Bureau of Standards circular No. 471, issued Oct. 8, 1948, pages 27–28.